United States Patent Office 3,511,336
Patented May 12, 1970

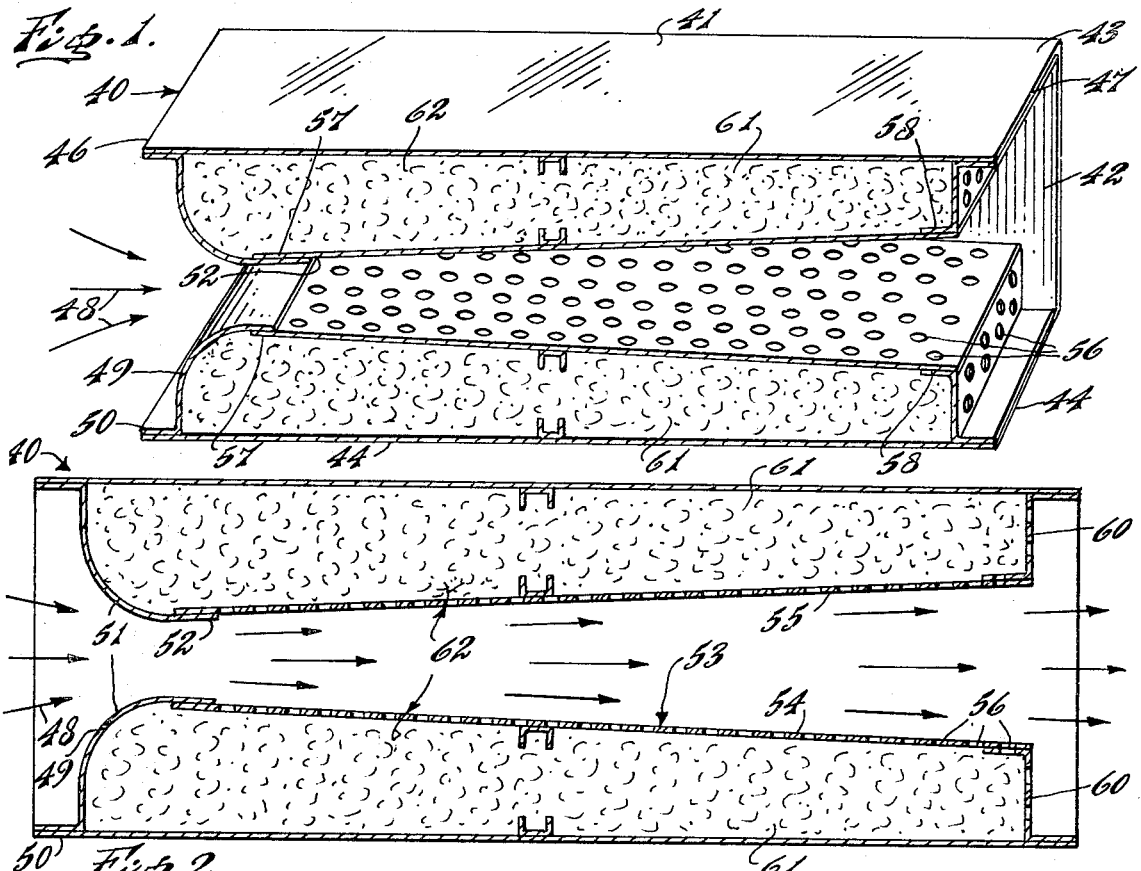
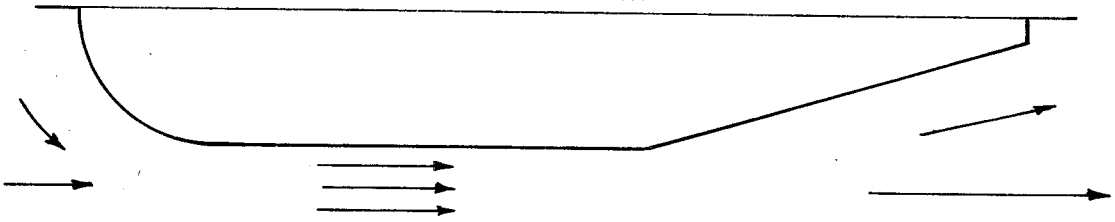
PRIOR ART
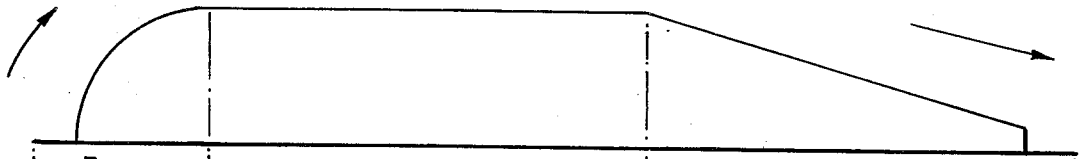
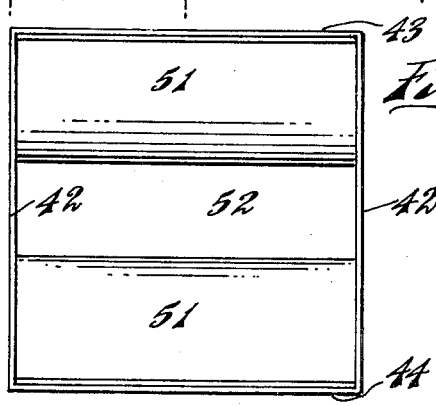

3,511,336
SOUND ATTENUATOR FOR AIR FLOW
Charles N. Rink, Hazleton, and August Sauter, Jr.,
Conyngham, Pa., assignors to Rink Corporation,
Hazleton, Pa., a corporation of Delaware
Filed June 10, 1969, Ser. No. 832,882
Int. Cl. F01n 1/04, 1/10
U.S. Cl. 181—42    1 Claim

ABSTRACT OF THE DISCLOSURE

A sound attenuator for insertion in a duct conveying air. The attenuator has an outer housing and an inner air passageway having, in line, an arcuate converging leading section and a constantly diverging, trailing section, which results in a minimum pressure drop through the attenuator with a maximum noise attenuation in the lower frequencies.

BACKGROUND OF THE INVENTION

Field of the invention

This relates to attenuators, or sound traps, or silencers, for systems in which air is moved through duct work or pipes. Noise is involved in such movement of air and sound attenuators or traps or silencers are used to remove the noise from the moving air.

Description of the prior art

One early method of removing noise from air travelling through duct work or pipes was simply to line the interior of the ducts or pipes with a porous material such as felt. This was not very effective, particularly for low frequency noise. Another method was to pass the air through a trap having a tortuous or zig-zag sight-proof flow path therein. The passageway had sides of perforated material with a "fill" material such as spun fiber glass packed behind the perforated material. The air, in flowing through such a zig-zag, abruptly changing pathway, was subjected to much turbulence and consequent pressure drop. Such turbulence and high pressure drop were undesirable.

Straight through, in line, sound attenuators were subsequently developed, of a type shown in U.S. Pat. 3,033,-307, for Noise Attenuating Apparatus, issued May 8, 1962. The type shown in the referred to patent which is essentially the design still used in the industry today, has a flow path formed of a converging entrance E, an intermediate section having a constant, parallel, cross section I, and a diverging exit section X. This is shown schematically in FIG. 4 of the present drawings. This arrangement was a combination based on part of the features of the earlier art. The convergent arcuate type of throat entrance E was selected to provide a low pressure loss without excess friction, that would result, for instance, from a more abrupt entrance.

The constant cross section throat area was selected from the earlier art teachings where it was believed that in order to achieve noise attenuation of air flow, one should have the longest, narrowest, parallel passage possible in order to provide an optimum thickness of absorbent material, for the longest distance, surrounding the flow. It was further known that the tapered down stream end of the device, with its thinner layer of felt material, would absorb the high frequency sound.

Finally, the diverging exit section was chosen to provide for expansion of flow from the constant cross section throat area to the duct or pipe cross section area. It was recognized that a divergent angle in the diverging exit section equal to the venturi angle (approximately 2½° to 3½°) yielded a minimum pressure drop through the attenuator, but that use of such an angle, being extremely small, resulted in a prohibitively long structure. Accordingly, the art used a divergence angle considerably greater than 2½° to 3½° (U.S. Pat. 3,033,307, col. 4, lines 13 to 24), after concluding that the venturi angle would be impossible to implement, and accepted the increased pressure drop to acquire the desired acoustical attenuation characteristics which were believed to be primarily achieved in the constant cross section intermediate region.

SUMMARY OF THE INVENTION

The present structure is of a straight through type having a design which achieves a remarkable reduction in pressure drop over the prior art in line type described above, while retaining equal or better noise absorption characteristics. The present structure has a continuous divergent passage rather than a partially straight parallel passage and then a partially divergent passage as taught in the prior art.

The angle of divergence of the constantly diverging section is between 2½° to 3½°, which is referred to in the prior art as the "venturi angle." This is one which closely follows the normal expansion of an air stream when ejected from an opening. This results in less skin friction along the surfaces of the air passage and hence lower pressure drop. There is also less turbulence of air along this boundary or separation layer and hence there is less generated sound. In a similar way, this highly efficient angle of air ejection from the throat tends to minimize any change in attenuation due to change in air velocity.

The present structure yields the following benefits over the prior art structures:

(a) considerably lower pressure drop;
(b) more noise attenuation in the lower frequencies;
(c) less change in attenuation due to air flow;
(d) less over-all airflow generated sound, particularly in the important lower frequencies;
(e) less high frequency attenuation.

These benefits all contribute to the presently considered optimum, in this field of sound attenuation, namely, maximum noise attenuation of low frequency noises, less over-silencing of the high frequency noises, minimizing noise generation within the silencer, minimizing pressure drop through the silence, and reduction of variations of attenuation with air flow.

BRIEF DESCRIPTION OF THE DRAWINGS

FIG. 1 is a fragmentary perspective view of the silencer of the present invention.

FIG. 2 is a side elevational section of the attenuator of FIG. 1.

FIG. 3 is a front elevational view of the structure of FIGS. 1 and 2.

FIG. 4 is a schematic view of the prior art in-line attenuator.

DESCRIPTION OF THE PREFERRED EMBODIMENT

Sound attenuator 40 has an outside housing or casing 41, rectangular in cross-section, which includes vertical sides 42 and upper and lower sides 43 and 44. The attenuator is open at both ends, and the housing 41 conforms in cross-section to the duct in which the attenuator is inserted. The attenuator 40 is suitably secured to duct work at 46 and 47 whereby air under pressure enters at 46 in the direction of the arrows 48. The attenuator 40 has an arcuate converging section 49 which is suitably secured, as by spot welding at 50 to the attenuator housing 41. Converging section 49 has arcuate curved sections 51, opposing and similar, which smoothly guide the airflow into a throat 52. The radius of the arc of the curved sections 51 is chosen to yield a throat opening between arcuate sections equal to approximately 22% of the height of the attenuator measured between upper side 43 and lower side 44.

On the exit side of the throat 52, there is section 53 which has planar surfaces 54 and 55. Each of these surfaces lies in a flat unbroken plane. Surfaces 54 and 55 respectively lie in planes which form a divergent angle of between 2½° and 3½°, with the longitudinal enter line of the attenuator 40, and hence form an included angle of between 5° to 7°.

This included divergence angle gives maximum pressure regain, with minimum air flow generated sound, and maximum attenuation in the low frequencies, and permits use of a throat 52 which may be permissibly smaller than that used in the prior art. The efficiency of pressure regain to force the air through more than compensates for greater initial pressure drop encountered by the smaller throat area.

Surfaces 54 and 55 are formed of a flat perforated sheet. Perforations 56 are, for instance, of a diameter of ⅛" and create less than 14% void in the sheet surface. Surfaces 54 and 55 are supported at one end 57 by a spot weld, on arcuate sections 51, and at the trailing edge 58. The trailing edge 58 is joined to a support 60 by spot welding or the like. Support 60 may be perforated in the same manner as surfaces 54 and 55.

An acoustical fill material 61 is inserted or packed in absorption chambers 62. The fill material may be of an inorganic mineral wool type as, for instance, a glass-like fiber of approximately 4 pounds density compressed at least 5%.

It should be noted that in the embodiment shown, the design is symmetrical about the horizontal center line, when viewed in elevation. However, the exit section may be formed non-symmetrical about the center line, maintaining the included divergent angle of between 5° and 7°.

In operation, air enters attenuator 40 at 48 and is guided by converging sections 51 into the throat 52 of the attenuator. At throat 52 the air flow has a maximum velocity and a minimum static, or head, pressure.

The smaller throat area passes less acoustic energy or noise.

After passing through the throat 52, the air flow begins immediately to expand, and velocity decreases. It is known that any change from a higher velocity to a lower velocity is accompanied by a conversion from velocity to static pressure, but inasmuch as there is always some loss in making this conversion, the total pressure is not the same after making the reduction in veloctiy. That is, there is always a certain portion of this converted static pressure lost in making the change, and the efficiency of conversion is never the full 100%. In the present structure, a most efficient conversion is obtained by virtue of using the optimum slope on the surfaces 54 and 55. This optimum slope is an angle of 2½° to 3½°, which is the angle at which there is at least turbulence and skin friction during expansion. There is a minimum of turbulence created on one hand, since the air is confined to its natural expansion by the surfaces 54 and 55, while on the other hand, there is a minimum of skin friction since there is no confinement less than its natural expansion angle. As the air is constantly expanding and traveling longitudially through the attenuator downstream of the throat 52, noise is being absorbed through the perforations 56 in the surfaces 54 and 55 into the acoustical fill material 61.

When the air flow reaches the tail or trailing edge at the exit, the air has expanded to approximately 45% of the cross-sectional area compared to where the air entered the attenuator, and the final expansion takes place into the duct work with a minimum of further turbulence.

Comparative test results between the prior art and the present structure show substantial gains by the present structure. Measurements were made in various octave bands, and pressure drops were measured for various flows. The results were as follows:

| Old octave band number previously used | New preferred octave band number now used | Octave band midfrequency (Hz.) | Prior art (decibel attenuation) | Present structure (decibel attenuation) |
|---|---|---|---|---|
| 1 | 18 | 63 | 3 | 5 |
| 2 | 21 | 125 | 8 | 8 |
| 3 | 24 | 250 | 18 | 18 |
| 4 | 27 | 500 | 27 | 29 |
| 5 | 30 | 1,000 | 35 | 37 |
| 6 | 33 | 2,000 | 37 | 33 |
| 7 | 36 | 4,000 | 29 | 20 |
| 8 | 39 | 8,000 | 18 | 13 |

| Pressure drop (entering face velocity) | Prior art static pressure loss (inches water gage) | Present structure static pressure loss (inches water gage) |
|---|---|---|
| At 1000 ft./min | 0.44 | 0.23 |
| At 2000 ft./min | 1.77 | 0.91 |

During the convergence of air into throat 52, air velocity is increased at the expense of static pressure. By virtue of the more efficient static pressure regain of the present structure, achieved by the optimum constantly increasing angle of divergence, a greater initial static pressure reduction is permitted. Hence a smaller throat area can be used in the present structure over that of the prior art, in view of the fact that a smaller throat requires a higher air velocity to pass the same air volume. Acoustically, a smaller throat area is highly desirable since this permits larger converging sections 51, which in turn repel or reflect a greater amount of noise or sound energy which is being carried by the air stream as it enters the attenuator.

The above disclosure and drawings are directed to a rectangular embodiment of a silencer, but it should be understood that the disclosure is equally applicable to a round cross-sectional silencer wherein any section taken transversely of the silencer is circular in form. The design of a round silencer of this type corresponds to a design in which a longitudinal section of a rectangular silencer, as shown in FIG. 2 of the present drawings, is rotated about its longitudinal axis to generate a round silencer of circular cross-section.

Although reference is made above only to air, the disclosure is applicable to other gases.

We claim:

1. A sound silencer for insertion in a duct having an airstream flowing therethrough comprising in combination:
   (1) an outside housing having
       (a) a cross section rectangular in shape and conforming in size to the cross section of the duct in which the silencer is inserted
       (b) openings at both ends
       (c) a longitudinal center line;
   (2) an air passage extending longitudinally within the housing and having
       (a) an entrance section
           (1) for convering the air entering the silencer
           (2) formed of a pair of similar, oppositely disposed arcuate members
           (3) secured to the housing
       (b) an exit section
           (1) jutxaposed and connected to the entrance section
           (2) formed of a pair of opposing, flat, planar surfaces
               (a) having perforations therein
               (b) forming a divergent angle of approximately 3° with the longitudinal center line of the silencer
(c) forming an included angle of approximately 6° with each other
for constantly expanding the air immediately after the air is compressed in the entrance section; and
(c) a throat formed at the connection between the juxtapositioned entrance and exit sections having a cross sectional area less than 25% of the cross sectional area of the housing; and
(3) absorption chambers
(a) formed by the housing, entrance, and exit sections
(b) containing acoustically absorbent fill material sound passing through the perforations.

References Cited

UNITED STATES PATENTS 3,033,307    5/1962    Sanders et al. _____ 181—56 XR

FOREIGN PATENTS 984,817    3/1965    Great Britain.
986,576    3/1965    Great Britain.

ROBERT S. WARD, Jr., Primary Examiner

U.S. Cl. X.R.

181—48